UNITED STATES PATENT OFFICE.

LUDWIG TAUB, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AMID OF β-β-DIETHYLPROPIONIC ACID.

977,053.  Specification of Letters Patent.  Patented Nov. 29, 1910.

No Drawing. Original application filed October 21, 1909, Serial No. 523,805. Divided and this application filed February 15, 1910. Serial No. 543,978.

*To all whom it may concern:*

Be it known that I, LUDWIG TAUB, doctor of philosophy, chemist, citizen of the German Empire, residing at Elberfeld, Germany, have invented new and useful Improvements in Amid of Beta-Beta-Diethylpropionic Acid, of which the following is a specification.

My invention relates to the manufacture and production of a new valuable pharmaceutical product which is chemically the amid of beta-beta-diethylpropionic acid and which according to my researches is a valuable sedative.

The present application is a division of my application Serial No. 523,805, filed October 21, 1909.

The new product is a crystalline compound soluble in hot alcohol and hot benzene. When reacted upon by hot alkalies, it is split up into the beta-beta-diethylpropionic acid and ammonia.

In carrying out my process practically I can proceed as follows, the parts being by weight:—390 parts of beta-beta-diethylpropionic acid are heated to 100° C. with 140 parts of $PCl_3$, the product of the reaction is separated from the phosphoric acid by decanting of the formed acid chlorid and the chlorid is distilled *in vacuo*. The chlorid of beta-beta-diethylpropionic acid is then treated with an excess of ammonia, the amid is filtered off and crystallized from benzene. It is a white crystalline powder melting at 127.5° C., difficultly soluble in cold water, more easily in hot water, soluble in hot alcohol and hot benzene; liberating the free acid when reacted upon by caustic alkali and exhibiting valuable therapeutic especially sedative properties; an average dose being from ½ to 1 gram. The reaction proceeds in accordance with the following equations:

(I.) $3 \begin{matrix} C_2H_5 \\ C_2H_5 \end{matrix}\!\!\!>\!\!CH-CH_2COOH+PCl_3=$
$3 \begin{matrix} C_2H_5 \\ C_2H_5 \end{matrix}\!\!\!>\!\!CH-CH_2COCl+P\!\!<\!\!\begin{matrix} OH \\ OH \\ OH \end{matrix}$

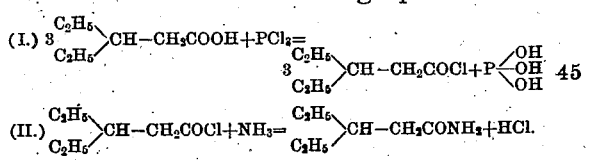

I claim:

The herein-described new amid of beta-beta-diethylpropionic acid being a white crystalline compound melting at 127.5° C., soluble in hot alcohol and hot benzene; liberating the free acid when reacted upon by caustic alkali and exhibiting valuable therapeutic especially sedative properties, substantially as described.

In testimony whereof I have hereunto set my hand in the presence of two subscribing witnesses.

LUDWIG TAUB. [L. S.]

Witnesses:
 OTTO KÖNIG,
 CHAS. J. WRIGHT.